Oct. 17, 1967  F. W. BEUSHAUSEN ET AL  3,347,425
INSTANT COFFEE DISPENSER WITH ADJUSTABLE TRAP CHAMBER
Filed June 16, 1966

INVENTORS
Frederick W. Beushausen
Robert D. Parry
BY
Wood, Herron & Evans
ATTORNEYS

United States Patent Office 3,347,425
Patented Oct. 17, 1967

3,347,425
INSTANT COFFEE DISPENSER WITH ADJUSTABLE TRAP CHAMBER
Frederick W. Beushausen, 1142 Burney Lane, Cincinnati, Ohio 45230, and Robert D. Parry, Cincinnati, Ohio; said Parry assignor to said Beushausen
Filed June 16, 1966, Ser. No. 557,955
4 Claims. (Cl. 222—305)

ABSTRACT OF THE DISCLOSURE

The instant coffee dispenser device of this invention is preferably integrally formed with a dispenser base support that is adapted to be snapped into a threaded rim in order that operable engagement of the device with a coffee jar may be effected. Integral with the dispenser base support is a slideway casing. A coffee carrier is adapted to reciprocate into and out of the slideway casing. The coffee carrier has structure defining a carrier chamber that is open at its top and bottom. When inside the slideway raising, the bottom opening of the carrier chamber communicates with a feed aperture in the base support, thereby enabling the chamber to be filled with coffee from the jar; the top opening of the chamber being closed during the filling step through cooperation of the dispenser casing with the carrier. To release the coffee from the carrier, the carrier chamber is merely pushed out from underneath the casing, thereby exposing the open top of the chamber to the atmosphere, and the coffee permitted to fall into a coffee cup. At the release position of the coffee carrier, the bottom opening of the carrier chamber is closed through cooperation of the slideway surface or bottom of the slideway casing with the carrier. Also, during release of the coffee the trailing portion of the carrier structure covers the feed aperture in the dispenser base support, thereby maintaining the instant coffee inside the container free from contact with the atmosphere.

The distance through which the carrier reciprocates relative to the slideway casing is closely controlled by stops at each end of the carrier, the stops cooperating with leading and trailing edges of the casing to limit movement of the carrier. The fill position of the carrier, i.e., when the feed aperture and the bottom of the carrier chamber coincide, is located intermediate of the carrier's reciprocative travel path and the release position is located at one end of its reciprocative travel path. At both ends of the travel path, either the leading or trailing portions of the carrier may effect closure of the feed aperture to keep the instant coffee inside the jar free from contact with the atmosphere.

A movable partition is also provided with the dispenser, the partition being insertable into engagement with the coffee carrier chamber when it is desired to release less coffee into the cup. The removable partition permits the volume of the chamber available to accept coffee to be increased or decreased as governed by the taste of the coffee drinker. The partition is preferably vertically disposed within the chamber and is preferably held therein by means of a chamber lip and protuberances on the inside of the carrier structure which cooperate with the top of the slideway casing to maintain the partition in operable position. The partition never falls from the chamber whether the device is in the fill or release position because the reciprocative length of travel is such that the portion of the carrier chamber carrying the partition is never permitted to exit from underneath the top of the slideway casing.

Background of the invention

This invention relates to devices for dispensing measured amounts of granular materials from closed containers. More particularly, this invention relates to a dispensing device of the type having a dispenser associated with a lid of a container for permitting measured quantities of granular material inside the container to be dispensed therefrom without removing the container lid.

Over the past few years the consumer demand for instant coffee has grown steadily and rapidly to an extent where today it occupies a major portion of the home coffee market. The basic reasons for the acceptance of instant coffee by the housewife is its ease of preparation, and its economy of use in the sense that it may be quickly prepared when desired with very little waste and effort. This, of course, is in distinct contrast to the effort and time necessary to prepare freshly perked coffee.

Because of the extremely great consumer demand that has arisen for instant coffee, the field has naturally become attractive to a large number of producers. With the large number of producers have come a multiplicity of brands being offered to the public. Of course, among the methods used to successfully sell a given brand of instant coffee is advertising, e.g., in and on the various communication media. Another method used to effect sales of instant coffee is to include a premium item, e.g., a fancy jar, a coffee pot, or an instant coffee dispenser, with each container offered for sale. Naturally, the keynote of such premium items is that they must be most economical to manufacture, as well as useful, since they are normally given away with each purchase in an effort to increase sales.

Instant coffee dispensers that are adapted to be associated with jars or other types of instant coffee containers are not new in the art. Many different structural embodiments are known that have dispensers associated with lids for discharging measured quantities of instant coffee from containers, e.g., see U.S. 2,857,083 and U.S. 2,983,408. However, in each and every case, and particularly in the case of the devices disclosed in the above cited patents, the known embodiments are relatively complex and cumbersome to manufacture. Therefore, their usefulness as inexpensive or premium items to be given away with jars of instant coffee in the hope of increasing sales is strictly limited or non-existent.

Description of the invention

It has been the primary objective of this invention to provide an instant coffee dispenser that may be inexpensively manufactured so that it may be given away as a premium item with the sale of containers of instant coffee.

It has been a further objective of this invention to provide an instant coffee dispenser that may be easily and simply assembled from a minimum of structural parts.

Other objectives and advantages of the present invention will become apparent to those skilled in the art after considering the subsequent description and accompanying drawings of the preferred embodiment of the invention.
In the drawings:
FIGURE 1 is a partially cut away exploded, perspective view depicting the preferred embodiment of the instant coffee dispenser of this invention.

Figure 1:
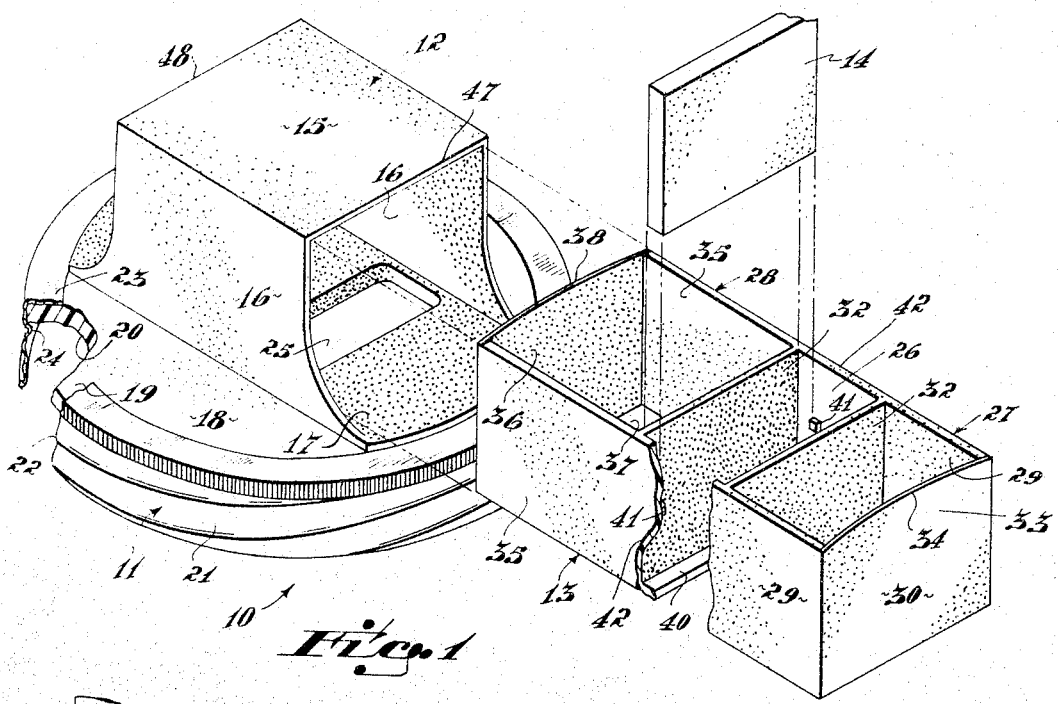

According to the principles of this invention, and as best seen from FIGURE 1, the instant coffee dispenser 10 includes a lid 11, a slideaway casing 12, a coffee carrier 13, and a removable partition 14. The slideway casing 12 includes a top 15, two side walls 16, 16, and a slideway base 17.

The lid 11 includes a base support or lid top 18 having a top surface 19 and a bottom surface 20. The base support 18 is of a diameter sufficient to permit it to be snapped into engagement with a ring or lid rim 21 having internal threads 22. The threaded lid rim 21 carries an inwardly extending annular lip 23 at the top of the rim and an annular rib 24 disposed intermediate the lip 23 and the bottom of the rim 21, the width of the annular channel base defined by the lip 23 and the rib 24 being dependent on the thickness of the lid top 18 between its top 19 and bottom 20 surfaces. The base support or lid top 18 has structure defining a feed aperture 25 that is positioned in the base 17 of the slideway casing 12. Of course, base 17 of the slideway casing 12, constitutes the plane or surface over which the coffee carrier 13 slides. It will be noted that the base or slideway 17 of the slideway casing 12 is slightly raised over the lip 23 of the lid rim 21 so that the coffee carrier 13 is not impeded in its reciprocatory movement through the casing by inadvertent engagement with the lip. The base support 18 and the slideway casing 12 are preferably formed from a relatively rigid material such as, for example, an ABS plastic, thereby providing sufficient flexibility to permit the base support to be snapped into operable engagement with the rim 21 while retaining a degree of toughness sufficient to prevent accidental breakage. Also such a material permits the base support 18 and slideway casing 12 to be integrally and inexpensively molded in, e.g., an injection molding machine.

The coffee carrier 13 includes a carrier chamber 26 located intermediate a leader section 27 and a trailer section 28. The carrier chamber 26 has an open top and bottom and is defined by two side walls 42, 42 and two end walls 32, 32. The leader section 27 is provided with side walls 29, 29 that are integral with the side walls 42, 42 of the carrier chamber 26, an end or front wall 30 and a bottom 31 that slides along the base or slideway 17 of the slideway casing 12. It will be noted that the side walls 29 and front wall 30 of the leader section 27 are substantially the same height as the side walls 42 and end walls 32 of the carrier chamber 26. Integral with top edge 33 of the front wall 30 of the leader section 27 is a front stop 34. The stop 34 has a silght arc to it, which arc extends above the top plane of the carrier 13 such that cooperative engagement with the leading edge 47 of the slideway casing top 15 is possible to prevent the carrier 13 from being inadvertently pushed out of operative engagement with the slideway casing 12 during the carrier's reciprocatory movement.

Figure 4:
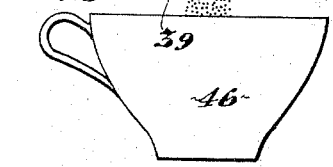
FIGURE 4 is a cross-sectional view similar to FIGURE 2 showing coffee being released into a cup.

The trailer section 28 is formed in much the same manner as the leader section 27, i.e., it has two side walls 35 integral with the side walls 42 of the chamber 26, an end or rear wall 36, and a bottom 37 in the same plane as the bottom 31 of the leader section 27. The rear wall 36 carries a rear stop 38 that cooperates with the trailing edge 48 of the slideway casing top 15 in the same manner as the front wall carries the front stop 34. Thus, once inserted in operable relationship with the slideway casing 12, the coffee carrier 13 can reciprocate between the two stops 34, 38 as its bottom 31, 37 slides along the slideway 17 of the casing. As best seen in FIGURE 4, the coffee carrier 13 is stopped at the forward end in the slideway casing 12 by the rear stop 38, thus means are provided by which the carrier is stopped from proceeding completely through the casing when proceeding in a right to left direction under normal operating conditions. The cross-sectional dimensions of the carrier 13 are such that, as the carrier reciprocates, it has a relatively tight fit with the slideway casing.

It will be noted that the carrier chamber 26 is preferably dimensionally positioned intermediate the front wall 30 of the leader section 27 and the rear wall 36 of the trailer section in a manner that permits the feed aperture 25 to be closed at all times when either the front 34 or rear 38 stop abuts the leading 47 or trailing 48 edge respectively on the slideway casing top 15. That is to say, the length of the side walls 29 of the leader section 27 are preferably at least equivalent to the length of the feed aperture 25 plus the overhang distance 39 which the top of the casing 15 overhangs the aperture on the leader section side. The length of the side walls 35 of the trailer section 28 are preferably equivalent in length to the top 15 of the slideway casing 12 minus the thickness of the removable partition 14, this length being provided such that the partition will be retained with the carrier chamber 26 of the coffee carrier 13 even when the carrier is in the release position, see FIGURE 4. It is to be understood that the side walls 29, 42, 35 of the coffee carrier 13 are preferably substantially equivalent in height to the inner walls of the casing to provide a relatively tight sliding fit so that closure of the top and bottom of the carrier chamber 26 may be effected depending on the position of the carrier 13 relative to the feed aperture 25. The stops 34, 38 at either end 30, 36 of the coffee carrier extend a distance above the height of the side walls 29, 35 sufficient only to provide cooperation with the top 15 of the slideway casing 12, e.g. 1/16 inch.

As before mentioned, a removable partition 14 is provided to reduce the available volume of the carrier chamber 26 to permit varying amounts of instant coffee to be accepted and, afterwards, released from the chamber, thereby varying the strength of the cup of coffee to the drinker's taste. The carrier chamber 26 is provided with a support flange 40 that is coplanar with the plane of the bottom 31, 37 of the carrier 13. Protuberances 41 extend inwardly from side walls 42 of the chamber 26 to cooperate with the support flange 40 in maintaining the partition 14 in operable engagement with the carrier chamber 26.

The rim 21 depicted in connection with the invention is preferably formed from a metal on known types of equipment for long life and easy fabrication. The slideway casing 12 and lid top 18, coffee carrier 13, and removable partition 14 are preferably formed from a relatively shock resistant and flexible material, e.g., an ABS plastic, to minimize the danger of breakage of the device through inadvertent sharp blows. Also, by forming the parts from a relatively flexible material the snap-in relationship of base support 18 with rim 21 and the easy and simple insertion and removal of the carrier 13 with the slideway casing 12 is provided. Of course, ABS plastics may be injection molded very cheaply and, because there are only three operative parts of the dispenser device that need be molded and assembled, the dispenser device and rim combination may be very inexpensively manufactured.

When operating the instant coffee dispenser the user must first decide as to whether or not a regular cup of coffee, i.e., with the partition 14 being positioned within the carrier chamber 26, or a strong cup, i.e., with the partition being removed from the chamber, is desired. Assuming a regular cup of coffee is desired, the partition 14 is inserted between the trailing end wall of the carrier chamber 26 and the protuberances 41, the partition resting on the support flange 40 that extends into the chamber from the bottom of the chamber's trailing end wall, see FIG. 1. The coffee carrier 13, with the partition 14 positioned therein, is then inserted into engagement with the slideway casing 12 by tipping the carrier upwardly, the leading or trailing edge of the bottom 31, 37 of the carrier being in engagement with the slideway or bottom of the casing and the associated stops 34, 38 being in engagement with the underside of the top 15 of the casing. The coffee carrier 13 is subsequently merely pushed through the slideway casing 12 until there is a stop 34, 38 on each side of the trailing 48 and leading 47 edges of the slideway casing top 15. As the carrier 13 is pushed through the slideway casing 12 the slideway casing top 15 merely flexes upwardly to allow either one of the stops 34, 38 to pass therethrough.

Figures 2, 3:
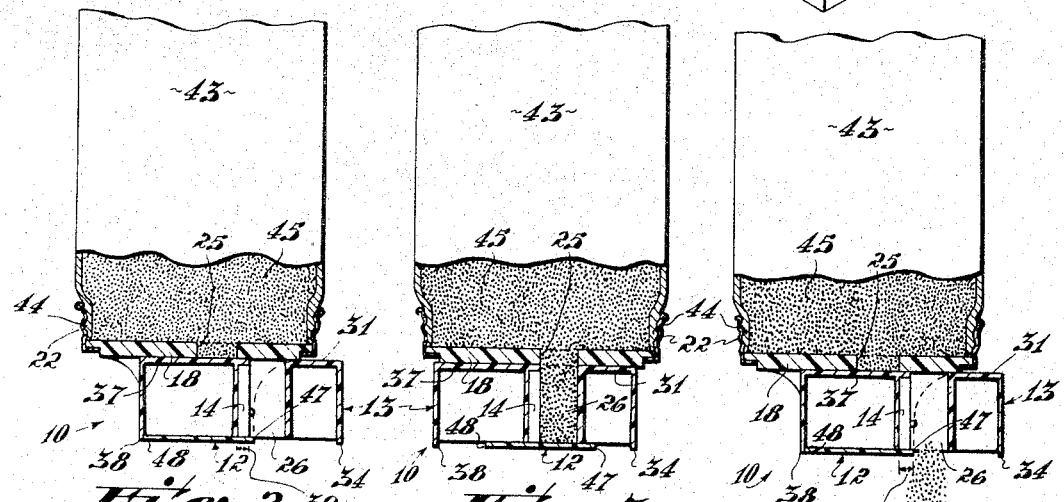
FIGURE 2 is a fragmentary, side view, with parts in section, of the instant coffee dispenser showing the dispenser in an assembled and release position.
FIGURE 3 is a cross-sectional view similar to FIGURE 2 showing the instant coffee dispenser in fill position.

To use the instant coffee dispenser of this invention, the lid rim 21 is screwed onto a coffee jar 43 that has suitable threads 44. The coffee carrier 13, as before mentioned, is normally placed in a position where one of the stops 34, 38 contacts an edge 47, 48 of the slideway casing top 15 so that the feed aperture 25 may be closed by means of cooperation with the bottom 31, 37 of the leader 27 or trailer 28 sections, to the outside atmosphere at all times. From such a position, as is shown in FIGURE 2, the coffee carrier 13 is moved intermediate its reciprocatory length of travel until the open bottom of the chamber 26 coincides with the feed aperture 25 in the lid 11. At this point, as is seen from FIGURE 3, coffee 45 from the jar 43 enters the chamber 26 and is prevented from immediately exiting therefrom through cooperation of the top of the chamber 26 with the inside of the top 15 of the slideway casing 12, which cooperation provides a sliding closure fit due to the dimensional relationships.

To remove or exhaust the instant coffee 45 into a coffee cup 46, the coffee carrier 13 is merly pushed through the slideway casing 12 until the rear stop 38 engages the trailing edge 48 of the top 15 of the casing, thereby exposing or opening the top of the carrier chamber 26 and permitting the coffee to drop into the coffee cup. Of course, as before described, for an extra strong cup of coffee, the coffee carrier 13 need merely be removed from the slideway casing 12 and the partition 14 taken out of the coffee chamber 26, thereby providing additional space within the chamber into which instant coffee 45 may flow so that a stronger cup of coffee results.

While the dispenser device of the present invention has been described in relation to the dispensing of instant coffee from a jar having a threaded neck, it is to be understood that such description is not intended in a limting sense but is merely illustrative of the preferred embodiment of the invention, all other applications to which the device may apply being intended as included herein. Of course, the invention would be equally applicable, for example, to containers having snap-on plastic lids. In addition, the dispenser device of this invention is capable of use with other types of granulated materials, e.g., laundry detergents.

What we desire to claim and protect by Letters Patent is:

1. A dispenser device for discharging measured amounts of granular material from a closed container comprising
    a lid adapted for operable engagement with said container, said lid having structure defining a feed aperture in the top thereof,
    a carrier adapted to reciprocate across the top plane of said lid, said carrier including structure defining a carrier chamber, said chamber being open at the top and the bottom with the bottom being alignable with said feed aperture in an operating relationship as said carrier reciprocates across the top of said lid.
    a slideway casing integral with said lid and adapted to maintain said carrier in an operable reciprocatory relationship with said lid, said casing being dimensioned so that the top of said casing cooperates with the top of said chamber to close the top of said chamber to the atmosphere when the bottom of said chamber is aligned with said feed aperture and to open the top of said chamber to the atmosphere when the bottom of said chamber is not aligned with said feed aperture,
    a stop located at each end of said carrier for cooperation with said slideway casing whereby said carrier may not be inadvertently reciprocated out of the operable relationship with said casing under normal operating circumstances,
    a removable partition for reducing the available volume of said chamber for receiving granulated material, and
    retainer means for maintaining said removable partition in operating engagement with said chamber, said retainer means including a lip extending from a wall of said chamber for preventing said partition from falling through said feed aperture when the bottom of said chamber is aligned with said feed aperture, and protuberances associated with other walls of said chamber to maintain said partition against the wall from which said lip extends, the position of said removable partition within said chamber being such that said partition is at all times retained within the chamber through cooperation of the top of said slideway casing, said lip, and said protuberances no matter where the carrier is positioned throughout its reciprocatory path.

2. A dispenser device as set forth in claim 1 wherein
    said carrier has external cross sectional dimensions permitting a relatively tight fit between said slideway casing and said carrier,
    said stops on the ends of said leading and trailing sections of said carrier for cooperation with said slideway casing are extended from the ends a distance not much greater than the thickness of said slideway casing, and
    said slideway casing and said carrier are formed from a relatively flexible material to permit said carrier to be removed from said casing upon flexure of said casing, said carrier and said stops for removal and insertion of said removable partition.

3. A dispenser device as set forth in claim 1 wherein said lid includes
    an annular rim adapted to be threadedly engaged with a jar having threads on the neck,
    an annular lip integral with said rim at the top thereof,
    an annular rib intermediate said lip and the bottom of said rim, and
    a lid top integral with said slideway casing and of dimensions permitting a snap-in relationship between said rib and said lip to effect operable engagement of said dispenser with said rim, said lid top being formed from the same relatively flexible material as said carrier and said slideway casing.

4. A dispenser device for discharging measured amounts of granular material from a closed container comprising
    a lid adapted for operable engagement with said container, said lid having structure defining a feed aperture in the top thereof,
    a carrier adapted to reciprocate across the top plane of said lid, said carrier including structure defining a carrier chamber, said chamber being open at the top and the bottom with the bottom being alignable with said feed aperture in an operating relationship as said carrier reciprocates across the top of said lid,
    a slideway casing integral with said lid and adapted to maintain said carrier in an operable reciprocatory relationship with said lid, said casing being dimensioned so that the top of said casing cooperates with the top of said chamber to close the top of said chamber to the atmosphere when the bottom of said chamber is aligned with said feed aperture and to open the top of said chamber to the atmosphere when the bottom of said chamber is not aligned with said feed aperture, said slideway casing also including a base upon which said carrier slides, said base being disposed in a plane above the top plane of said lid to permit free reciprocatory movement of said carrier.

a removable partition for reducing the available volume of said chamber for receiving granulated material, retainer means whereby said removable partition may be maintained in operating engagement with said chamber, and a stop located at each end of said carrier for cooperation with said slideway casing whereby said carrier may not be inadvertently reciprocated out of the operable relationship with said casing under normal operating circumstances, a leading section disposed at one end of said carrier chamber, said leading section carrying one of said stops at the end furthest removed from said chamber, and a trailing section disposed at the other end of said chamber, said trailing section carrying the other of said stops at the end furthest removed from said chamber, whereby said carrier may reciprocate between a first position whereat said trailing section effects closure of said feed aperture and the top of said chamber is open to the atmosphere, and a second position whereat the bottom of said chamber communicates with said feed aperture and the top of said chamber is closed through cooperation of said slideway casing with said carrier.

References Cited

UNITED STATES PATENTS

| | | | |
|---|---|---|---|
| 2,059,608 | 11/1936 | Rochester | 222—361 |
| 2,553,509 | 5/1951 | Altorfer | 222—361 |
| 3,122,278 | 2/1964 | Crozier | 222—305 |

FOREIGN PATENTS 407,081   3/1934   Great Britain.

SAMUEL F. COLEMAN, *Primary Examiner.*